Figure 2:
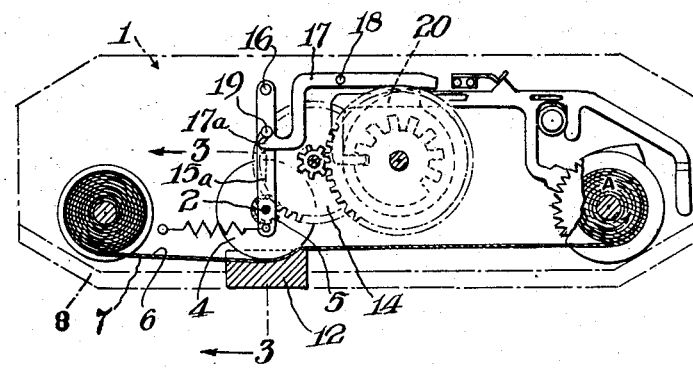

Nov. 4, 1958   A. WINKLER ET AL   2,858,752
SCANNING MECHANISM FOR ROLL-FILM CAMERAS
Filed Feb. 3, 1954   2 Sheets-Sheet 1

INVENTORS
Alfred Winkler
& Willy Kaden
BY Connolly and Hutz
ATTORNEYS

Nov. 4, 1958 A. WINKLER ET AL 2,858,752
SCANNING MECHANISM FOR ROLL-FILM CAMERAS
Filed Feb. 3, 1954 2 Sheets-Sheet 2
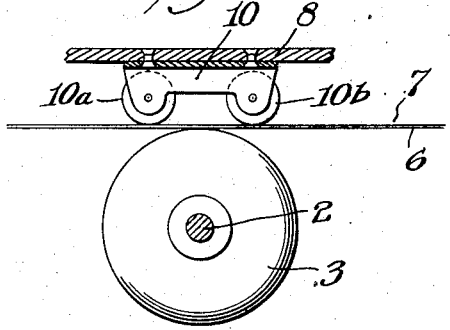
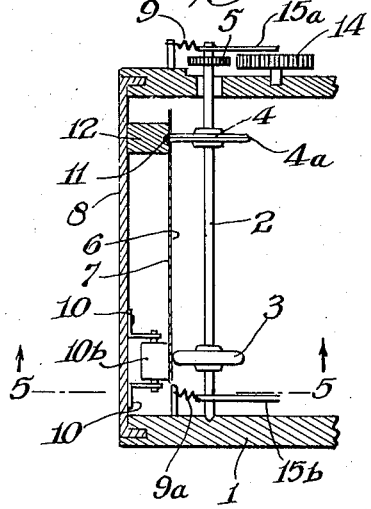
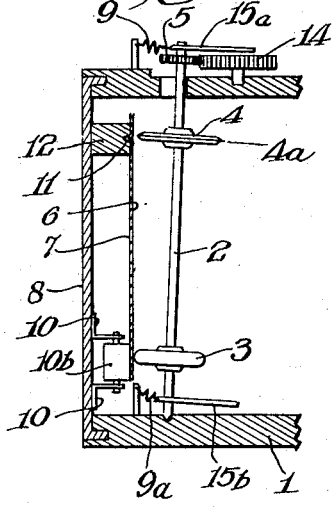
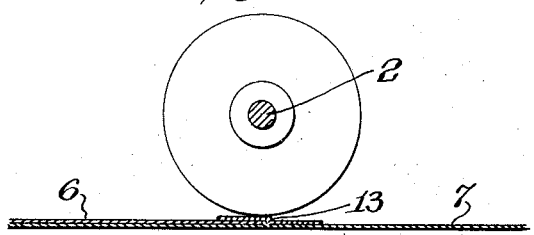
INVENTORS
Alfred Winkler
& Willy Kaden
BY Connolly and Hutz
ATTORNEYS United States Patent Office 2,858,752
Patented Nov. 4, 1958

2,858,752

SCANNING MECHANISM FOR ROLL-FILM CAMERAS

Alfred Winkler and Willy Kaden, Munich, Germany, assignors to AGFA Aktiengesellschaft Application February 3, 1954, Serial No. 407,958

Claims priority, application Germany March 6, 1953

7 Claims. (Cl. 95—31)

This new invention relates to a film metering device for cameras using roll films equipped with a paper adapter or backing means. The presently known devices of this kind are mostly complicated in construction, comprising many individual parts which take up a relatively large space. Furthermore, the mechanism very often is sensitive and easily subject to defects.

To overcome these disadvantages the present invention provides a mechanism based on the different mechanical deform abilities of a paper backing with and without film, and of the glued assembly where the end of the film is attached to the paper. Due to the nature and/or thickness of the different materials, said mechanism makes it possible, in the passage of the film, to indicate the position thereof and to effect coupling with a counting and measuring mechanism using a single shaft. For this purpose a shaft is arranged within the camera case which is biased by means of a pair of spring-pressed rocking levers. In addition to a roll for the contacting and marking of the film, a scanning disc is also rigidly connected to the shaft; this disc having a tapered periphery. The shaft is further equipped at one end with a pinion which provides for the coupling of the shaft with the counting and measuring mechanism. Two supports are rigidly positioned on the removable rear wall of the camera in the plane of the shaft. One of them is arranged so as to be adjacent the contact roll and consists preferably of a plurality of rolls which are located in a parallel plane to the shaft carrying the film contact roll; the other is arranged so as to be adjacent the scanning disc and has a shape adapted to comply with the specific type of feed motion as well as with the kind and thickness of paper backing and with the form of the scanning disc. The force of the two springs which are transferred via the rocking levers to the shaft becomes effective when the rear closure wall of the camera is put in place and the supports 10 and 12 bear against the members 3 and 4.

When the film strip is first inserted and the leader strip is pulled through, the shaft remains in position. However, when the paper-backed film portion is pulled through, the shaft is rocked against the spring pressure, resulting in the meshing of a pinion mounted on the shaft with a gear connected to the counting and measuring device. The upper rocking lever remains locked during the movement of the film and until the film is taken out of the camera. The locking of the rocking lever is effective by means of a detent, operated by a cam disc, the detent being forced into engagement with a pin, which is rigidly mounted on the upper rocking lever, by the cam. When the rear closure wall of the camera is taken off, the shaft is either automatically uncoupled from the counting and measuring device by the biasing action of the springs or may be manually returned to its initial position.

The advantage of the above described arrangement lies in the simple construction involving only few individual parts, which can be manufactured relatively inexpensively, and also in the fact that the arrangement as a whole is mechanically simple, is not easily subject to breakdowns and can be handled easily by the operator.

It is, therefore, one object of this invention to provide an automatic means for initiating a counting and measuring action when a predetermined portion of a film strip comes into a predetermined position in a camera.

Another object of this invention is to provide an automatic counting and measuring means for film roll cameras which has relatively few parts, which can be cheaply and easily manufactured, and which is simple in operation.

Figure 1:
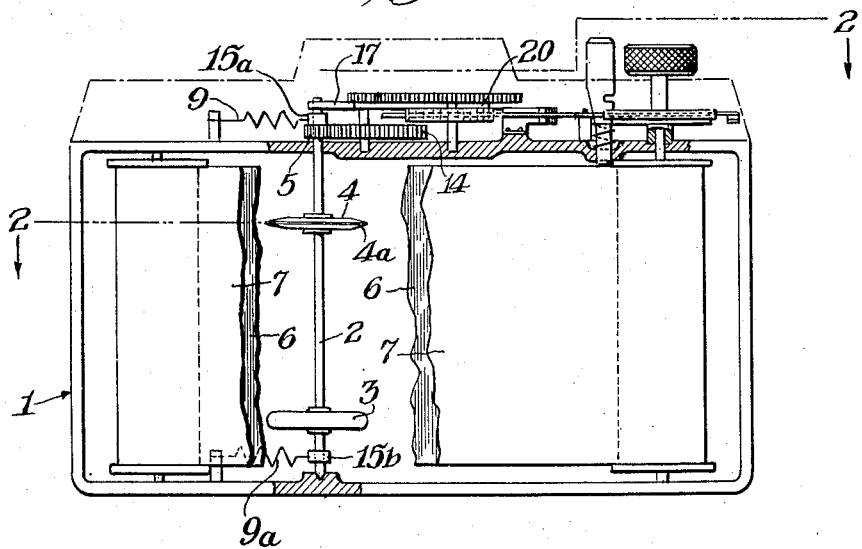

Other objects and many of the attendant advantages of this invention will be readily appreciated as the same becomes better understood by reference to the following detailed description when considered in connection with the accompanying drawings wherein:

Fig. 1 is a partly elevational and partly sectional view of the interior of the camera with parts broken away and with the rear closure wall removed, Fig. 2 is a sectional view taken on line 2—2 of Fig. 1, Fig. 3 shows a section in the plane 3—3 of Fig. 2 in a position whereby the coupling of the shaft and the metering device has not yet taken place, Fig. 4 shows the same section as Fig. 3 but after the coupling of the shaft and the metering device, Fig. 5 is a view taken on line 5—5 of Fig. 3, and Fig. 6 is a view showing the relationship between the scanning disc, the leader and the film portion.

Referring now in greater detail to the drawings wherein similar reference characters refer to similar parts, a shaft 2 is arranged within the camera case, there being a film contact roll 3, a scanning disc 4 and a pinion 5 rigidly connected to the shaft. When the roll film 6 is inserted into the camera without observing the marking on the paper backing 7, the camera rear closure member 8 is put in place in the usual manner. By closing the member 8, the power of the springs 9 and 9a becomes effective. The only force acting on the spindle driving roller is the friction of the material being wound which is needed to turn it. At first, when the film is drawn through the camera, the film leader lies between the film contact roll and the brace 10 consisting of the two rolls 10a and 10b, as shown in Fig. 5. At this time, the scanning disc 4, together with the leader portion and its outwardly tapered part 4a is pressed into the profile 11 of the brace 12 (see Fig. 3). As the leader strip ends, however, and the glued-on film portion 13 is reached, the increased thickness or lower tendency to deformation thereof causes the spring-pressed shaft 2 to be rocked at its upper end where it extends through a slot in the camera wall. This causes the pinion 5 to mesh with gear 14 which is connected to a counting and measuring mechanism.

On the film being further wound, an upper pivotable lever 15a, which can pivot about a pin 16 rigidly attached to the camera housing (a lower pivotable lever bears the reference number 15b), remains locked until the film is removed from the camera. This result is achieved by means of a latch 17 which can pivot about a pin 18 which is rigidly attached to the camera housing and, by means of a recess 17a therein, partially embraces and holds fast a pin 19 on the pivotable lever 15a. The latch 17 is controlled by a cam disc 20. When the film is removed from the camera, the counting and measuring mechanism either returns automatically, or is manually returned to its initial position.

The beginning and end positions of the film and the boundaries of the individual exposures are recorded by the counting and measuring mechanism which does not form part of the invention but, for the sake of completeness, is shown in Figs. 1 and 2.

Obviously many modifications and variations of the present invention are possible in the light of the above teachings. It is, therefore, to be understood that within the scope of the appended claims the invention may be practiced otherwise than as specifically described.

What is claimed in this invention is:

1. A film control mechanism for roll-film cameras adapted to be charged with film having a paper-leader and a light-sensitive strip; said mechanism comprising a displaceable shaft with means scanning said film for radially displacing said shaft when said light-sensitive strip passes said scanning means, and with rotating means driven by said film; a film measuring device adapted to be driven by said rotating means; and coupling means arranged on said shaft, said coupling means disconnecting said measuring device from said rotating means during winding of said paper-leader and operatively coupling said measuring device with said rotating means when said shaft is displaced during winding of said light-sensitive strip.

2. The mechanism of claim 1 wherein pressure means are provided for pressing said scanning means against said film so that said scanning means causes different deformations of said paper-leader and said light-sensitive strip.

3. The mechanism of claim 1 wherein said rotating means is a contact roller and said scanning means is a disc positioned to contact the film.

4. The mechanism of claim 3 wherein the scanning disc tapers towards its peripheral edge, and means are provided adjacent said scanning disc for supporting the film extending between said scanning disc and said support means, said support means having a groove mating with said edge.

5. The device of claim 3 wherein said contact roller is arranged adjacent one end of said shaft and said scanning disk and said coupling means are arranged adjacent the other end of said shaft.

6. The device of claim 5 in which that end of said shaft which is provided with said scanning disk and said coupling means is connected to a pivotal spring-loaded lever.

7. The device of claim 6 in which means are provided for locking the pivotal lever in the position into which it is pivoted on displacement of the shaft to effect engagement between said coupling and said measuring device.

References Cited in the file of this patent

UNITED STATES PATENTS

| 618,930 | Barker | Feb. 7, 1899 |
| 2,539,764 | Wisegarver | Jan. 30, 1951 |
| 2,548,172 | Pollock | Apr. 10, 1951 |
| 2,691,925 | Sewig | Oct. 19, 1954 |

FOREIGN PATENTS

| 176,557 | Great Britain | Mar. 16, 1922 |
| 290,321 | Switzerland | Mar. 22, 1950 |